United States Patent [19]
Campbell et al.

[11] Patent Number: 5,371,337
[45] Date of Patent: Dec. 6, 1994

[54] WELDING PROCESS AND APPARATUS

[75] Inventors: Mark A. Campbell, Canton; John J. Sniezek, Dearborn Heights; Robert I. Phillion, Washington, Mich.; Jeffrey N. Hernden, Romeo, all of Mich.

[73] Assignee: General Motors Corporation, Detroit, Mich.

[21] Appl. No.: 958,846

[22] Filed: Oct. 9, 1992

[51] Int. Cl.$^5$ ............................................. B23K 26/00
[52] U.S. Cl. ............................ 219/121.63; 219/121.64
[58] Field of Search ........................ 219/121.63, 121.64

[56] References Cited

U.S. PATENT DOCUMENTS

| | | | |
|---|---|---|---|
| 3,969,604 | 7/1976 | Baardsen | 219/137 |
| 4,603,089 | 7/1986 | Bampton | 428/593 |
| 4,634,832 | 1/1987 | Martyr | 219/121 |
| 4,650,954 | 3/1987 | Frings et al. | 219/121 LD |
| 4,684,779 | 8/1987 | Berlinger et al. | 219/121 |
| 4,694,136 | 9/1987 | Kasner et al. | 219/121 |
| 4,745,257 | 5/1988 | Rito et al. | 219/121 |
| 4,827,100 | 5/1989 | Frings et al. | 219/121.64 |
| 4,835,357 | 5/1989 | Schalk | 219/121 |
| 4,866,242 | 9/1989 | Martyr | 219/121 |
| 4,902,872 | 2/1990 | Frings et al. | 219/121.63 |
| 4,905,310 | 2/1990 | Ulrich | 219/121 |

FOREIGN PATENT DOCUMENTS

| | | |
|---|---|---|
| 0157913 | 1/1984 | European Pat. Off. |
| 86 09600 | 2/1986 | France |
| 59-133985 | 8/1984 | Japan |

OTHER PUBLICATIONS

Welding, Brazing & Soldering, Metals Handbook Ninth Edition, vol. 6; p. 663.

*Primary Examiner*—C. L. Albritton
*Attorney, Agent, or Firm*—Anthony Luke Simon

[57] ABSTRACT

An apparatus comprises a fixture for positioning a first sheet metal part in proximity of a second sheet metal part so that each sheet metal part has one surface facing the other sheet metal part across a gap and one surface facing away from the other sheet metal part, wherein at least one of the sheet metal parts comprises galvanized steel. A laser beam delivery device applies a laser beam to one of the facing away surfaces. A feed wire source provides a feed wire comprising a supplemental wire and a reactive agent at an intersection of the laser beam and the one facing away surface. The apparatus affects relative movement between the one facing away surface and the laser beam to provide a laser weld between the two sheet metal parts.

13 Claims, 7 Drawing Sheets

WELDING PROCESS AND APPARATUS

The subject of this application is related to copending U.S. patent application Ser. Nos. 07/958,823 and 07/958,981, now U.S. Pat. No. 5,274,211, entitled "Welding Apparatus and Process" and "Beam Bender Support Unit," respectively, both filed concurrently with this Application, both assigned to the assignee of this invention, and the disclosures of which are both incorporated herein by reference.

This invention pertains to a welding process and apparatus, and more particularly to a process and apparatus for laser welding galvanized steel.

BACKGROUND OF THE INVENTION

Use of lasers in industrial manufacturing environments has become widespread in recent years. Industrial uses of lasers include cutting and welding. In many instances, laser welding can replace resistance spot weld or MIG weld applications while providing greater flexibility and speed.

The use of a laser to weld sheet metal parts has presented some complicated obstacles. Typically, laser welding of sheet metal parts requires welding along seams one or more inches in length. When perfectly controlled surfaces are provided on sheet metal parts, laser welding of these seams has been done fairly easily. However, in more practical circumstances the surfaces of the sheet metal at the seams are not perfectly controlled. For example, there may be gaps at the seams where the two pieces of metal come together due to metal burrs, slight bends in the metal, etc. These gaps may range from 0 to 0.010 inches while a quality laser weld is maintained. However, gaps in the two pieces of metal in excess of 0.010 inches cause unsatisfactory welds and/or complete failure of the weld, rendering many sheet metal welding applications impractical.

When laser welding galvanized steel, the zinc coating of the steel vaporizes at a temperature at which the steel is still molten. This vaporization of the zinc can add to the formation of a laser beam blocking plasma barrier and can cause a porous weld. Known methods to address the vaporization of zinc include providing a painted on layer comprising a material that reacts with zinc or providing a high pressure gas barrier that prevents at least some of the zinc from boiling.

What is desired is a method for more effective laser welding of galvanized steel parts.

SUMMARY OF THE INVENTION

This invention provides a process and apparatus that enables quality welding of galvanized sheet metal parts. The process and apparatus of this invention allow a robot to laser weld galvanized sheet metal parts without requiring elaborate fixtures to eliminate gaps between the two parts. The process and apparatus of this invention provide quality laser welding of galvanized sheet metal parts along seams of which there are gaps of 0.040 inches or more between facing surfaces of the parts.

The process of this invention comprises positioning two sheet metal parts in proximity of each other so that each sheet metal part has one surface facing the other sheet metal part and one surface facing away from the other sheet metal part. At least one of the sheet metal parts comprises galvanized metal. A laser beam is applied to the facing away surface of one of the sheets and a feed wire comprising a supplemental metal and a reactive agent is provided at the intersection of the laser beam and the surface to which the laser beam is applied. The reactive agent reacts with the zinc in the galvanized steel to prevent at least a portion of the zinc from vaporizing and the supplemental wire acts as filler for a resulting weld to the extent necessary. A relative movement is affected between the sheet metal parts and the laser beam to provide a quality laser weld of the two sheet metal parts.

The apparatus of this invention comprises means for positioning two sheet metal parts in proximity of each other so that each sheet metal part has one surface facing the other sheet metal part and one surface facing away from the other sheet metal part. At least one of the sheet metal parts comprises galvanized metal. A laser beam delivery device applies a laser beam to the facing away surface of one of the sheets and a feed wire comprising a supplemental metal and a reactive agent is provided at the intersection of the laser beam and the surface to which the laser abeam is applied. The reactive agent reacts with the zinc in the galvanized steel to prevent at least a portion of the zinc from vaporizing and the supplemental wire acts as filler for a resulting weld to the extent necessary. A means affects relative movement between the sheet metal parts and the laser beam to provide a quality laser weld of the two sheet metal parts.

The process and apparatus of this invention can also be used to laser weld three or more sheet metal parts and are set forth in further detail below along with various examples thereof.

DETAILED DESCRIPTION OF THE INVENTION

Figure 1:
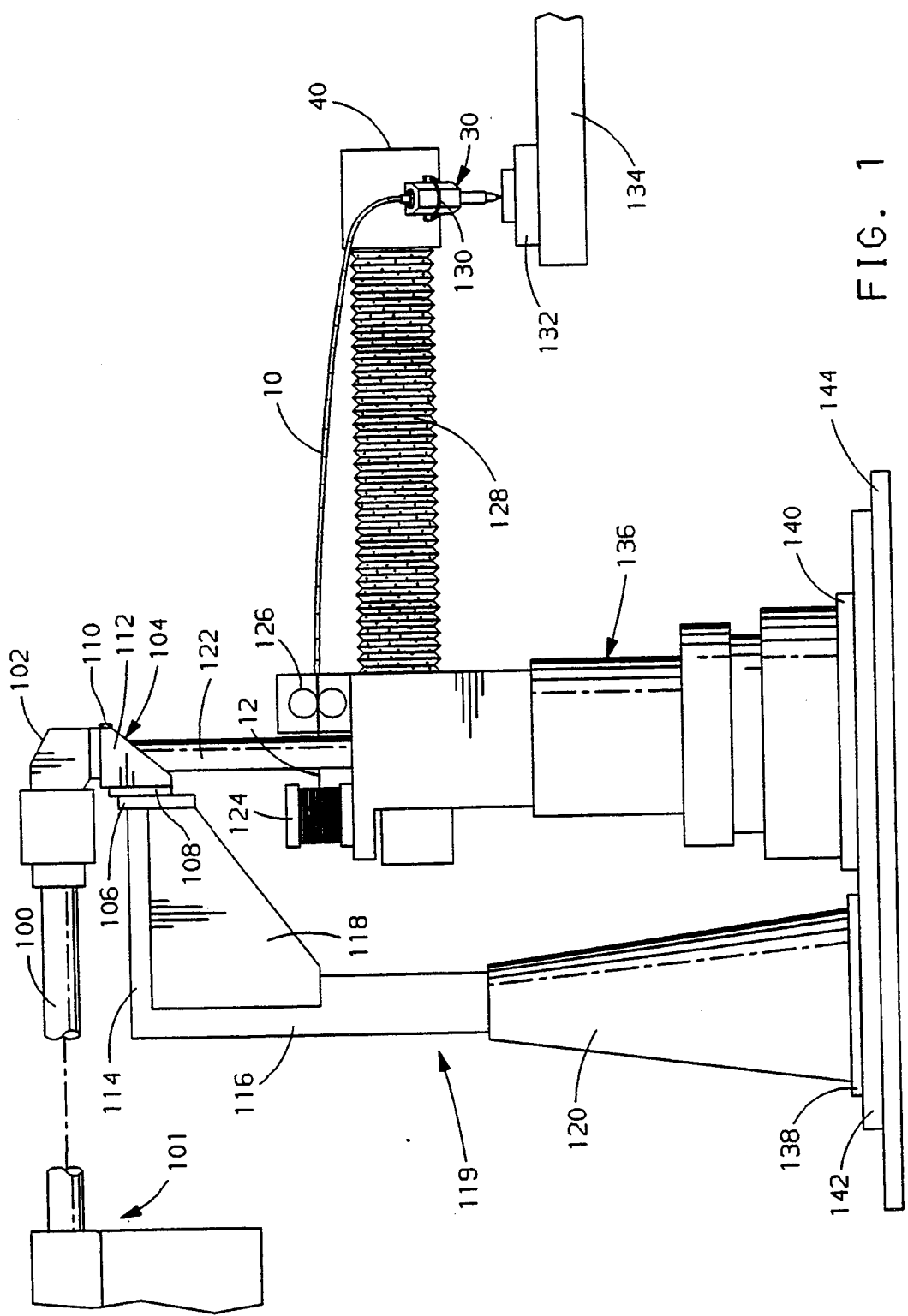
FIG. 1 is an illustration of the apparatus of this invention.

FIG. 1 illustrates the apparatus of this invention including fixture 132, laser delivery robot 136, and a wire feed device including components 124, 126 and 30. Means (such as fixture 132) positions two sheet metal parts in proximity of each other so that each sheet metal part has one surface facing the other sheet metal part and one surface facing away from the other sheet metal part. At least one of the sheet metal parts comprises galvanized steel.

Fixture 132 may be carried alone by any type of suitable carrier including a turntable, such as turntable 134 shown, or any other type of assembly line carrier. The type of work-piece fixture and carrier will vary from implementation to implementation as specific design constraints require.

Laser delivery robot 136, which receives a laser beam through a tube 100 from laser generator 101, is of a type commonly known to those skilled in the art. The laser beam delivery robot 136 is a device that directs a laser beam to the facing away surface of one of the sheets of metal and a feed wire comprising a supplemental metal and a reactive agent is provided at the intersection of the laser beam and the surface to which the laser beam is applied. The reactive agent reacts with the zinc in the galvanized steel to prevent at least a portion of the zinc from vaporizing and the supplemental wire acts as filler for a resulting weld to the extent necessary. The reactive agent may be any type of suitable composition that reacts with zinc in a manner to minimize vaporization of the zinc in the galvanized steel sheets. One suitable example of a reactive agent is iron oxide.

Controlled movement of the robot 136 in a manner well known to those skilled in the art affects relative movement between the sheet metal parts and the laser beam to provide a quality laser weld of the two sheet metal parts.

The wire feed device includes a wirefeed apparatus 30, shown mounted on the end of robot arm 128, which receives wire 12 through cable 10 from a motorized wire delivery system 126 of a type commonly available to those skilled in the art of MIG welding. The wire supply is retained in spool 124, which is mounted to the shoulder of the robot unit 136. The cable 10 can be easily run along the robot arm 128 in a manner to avoid twisting and kinking of the cable 10.

The laser beam is generated by laser generator 101 of a type well known to those skilled in the art and is delivered through tube 100 to the beam bender 102, which deflects the laser beam down tube 122. Accurate positioning of beam bender 102 is critical and adjustment is provided by beam bender support 104. A brief description of beam bender support 104 is set forth below and a more detailed description of the beam bender support can be found in the above mentioned copending patent application, Attorney Docket No. G-9976.

Beam bender support 104 is mounted on support unit 119 comprising vertical support 116 and arm 114 with two support plates 118 (only one shown) welded on each side of the vertical support 116 and arm 114. Two support plates 120 (only one shown) are mounted to the outsides of vertical support 116 and to base plate 138. Plates 106 and 108 along with an adjustment bolt (not shown) provide vertical adjustment of the beam bender 102. Similar plates (not shown) are positioned above support plate 112 to provide horizontal adjustment of the position of beam bender 102 along two axes through rotation of two thread screws 110 (only one shown).

Both the robot 136 and the support unit 119 possess integral base plates 138 and 140, respectively, which are doweled to base plate 142 on grout support plate 144. Even with a 1.5 inch steel base plate 142, care must be taken not to vary the load on the base plate 142 as varied loads on base plate 142 may cause flexing and disturb the positioning of the laser beam by the robot 136.

Referring to FIGS. 2, 3, 4 and 5, an example wirefeed apparatus 30 of the type described in the above mentioned copending patent application Ser. No. 07/958,823, is preferred as part of the wire feed device. However, any other suitable type of wirefeed device may be used as an alternative.

Figure 2:
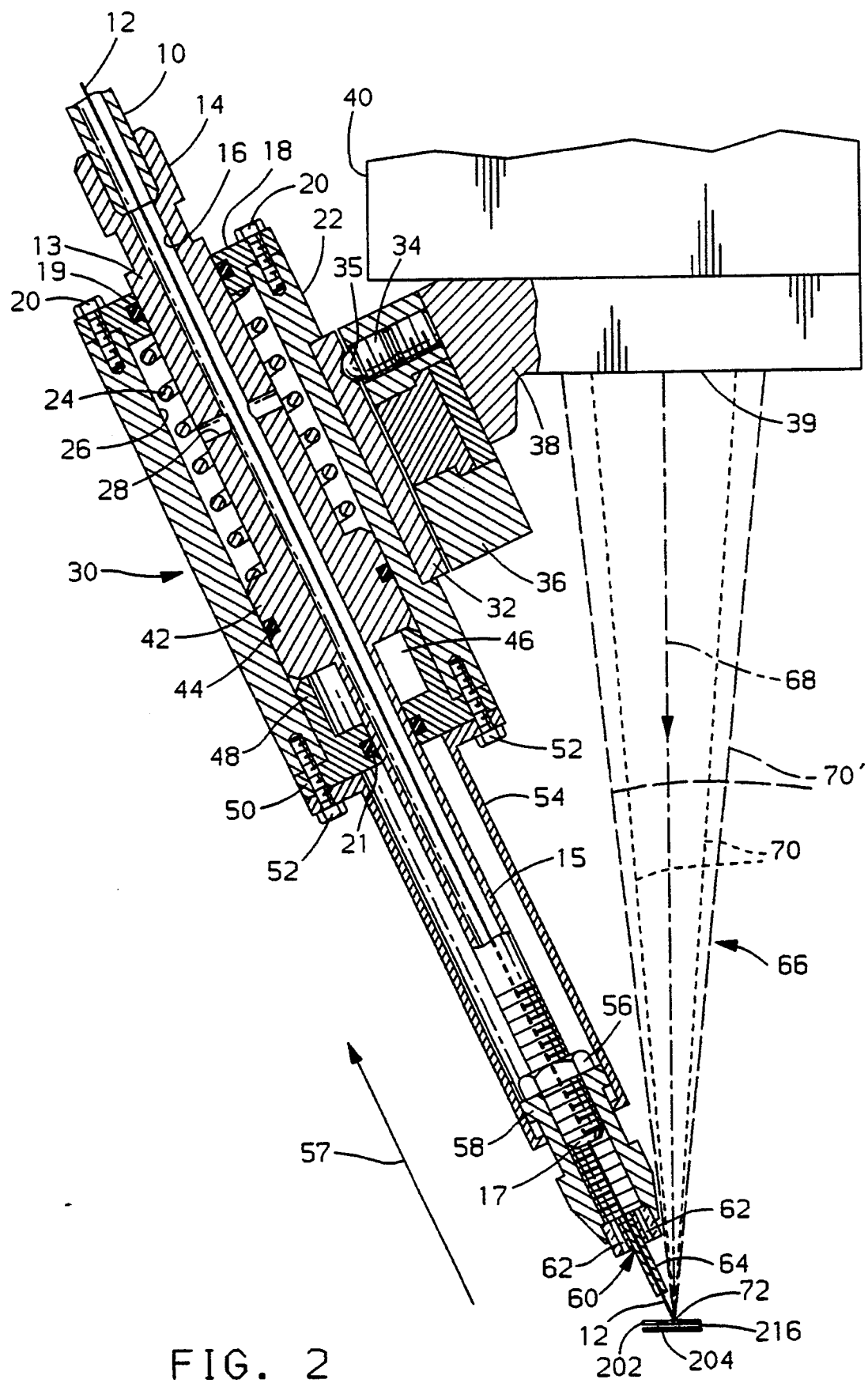
FIGS. 2, 3, 4 and 5 illustrate an example device for providing feed wire.

Referring to FIG. 2, reference 40 illustrates a laser delivery head of a type typically found on a laser delivery robotic arm. Within the laser delivery head 40 is a mirror (not shown) that reflects laser light onto a surface of the work-piece such as metal 202 through aperture 39 in the delivery head 40. The mirror is typically parabolic in shape to provide a focal point for the laser beam 66 proximate to the surface of the work-piece 202.

Attached to the laser delivery head 40, by mounts 38 and 36, is the wirefeed apparatus 30. The wirefeed apparatus 30 comprises a piston 14 mounted within a cylinder body 22 having a piston body 42 and piston shaft portions 13 and 15. A hollow bore 16 is machined axially through the entire length of the piston 14. Cable 10, attached to piston 14, comprises a hollow casing through which feed wire 12 is delivered. Feed wire 12 comprises the reactive agent and a supplemental metal. The wire travels through the bore 16 in piston 14 and out of the delivery end 17 to the delivery head 58 and wirefeed delivery tip 60. Wirefeed tip 60 has an extended portion 64 and an axial bore 63 through which the supplemental wire is fed. Feed wire 12 exits the extended portion 64 and is provided at the intersection of the laser beam 66 and sheet metal 202.

The cylinder 22, along with end caps 18 and 50 attached to the cylinder 22 via suitable means such as screws 20 and 52, define first and second piston chambers 26 and 46. Within the piston chamber 26 is a compression spring 24 that biases the piston in the extended position as shown. Pressurized air is supplied to piston chamber 46 to force piston 14 into a retracted position, compressing spring 24 and retracting piston 14 along with the wire delivery head 58 and tip 60 in the direction of arrow 57. The piston body 42 has an O-ring seal 44, as shown, to pneumatically isolate the cylinder chambers 26 and 46. The cylinder end caps 18 and 50 are also provided with O-ring seals 19 and 21, which pneumatically seal the cylinder chambers 26 and 46 while allowing piston 14 to extend through and retract slidably within the end caps 18 and 50 as shown. Cylinder end cap 50 has a cylindrical extension 48, which acts as a stop rest for the piston body 42 when it is biased in the extended position by spring 24.

A cover 54 surrounds the portion of the piston shaft 15 close to the weld to prevent weld flash from adhering to the exterior of the piston shaft 15, causing friction where piston shaft 15 slidably engages cylinder end cap 50. The cover 54 may also be attached to cylinder 22 by means such as screws 52.

The wirefeed delivery head 58 is attached to the end of piston 14 by any suitable means including threading the end of piston 14 and the internal bore of wirefeed head 58 so that the two pieces are threadably engaged together. Wirefeed delivery head 58 is positioned by jam nuts 56, which are also threadably engaged to piston 14 and are locked together in the desired position.

The wire delivery tip 60 preferably comprises a ceramic composite such as Crystaloy Series 2311 available from Industrial Ceramic Technology, Ann Arbor, Mich. The ceramic wire delivery tip 60 provides high heat resistance and is suitable for the environment of the laser weld. The ceramic wire delivery tip 60 is molded from the ceramic composite and laser machined to the shape shown to fit within the wirefeed head. The ceramic wire delivery tip 60 is bonded in place therein by a high temperature adhesive of any suitable type well known to those skilled in the art. The wire delivery tip 60 has a center bore 63 through which the wire 12 is delivered and has side bores 62 through which a shield gas may be delivered.

Figure 3:
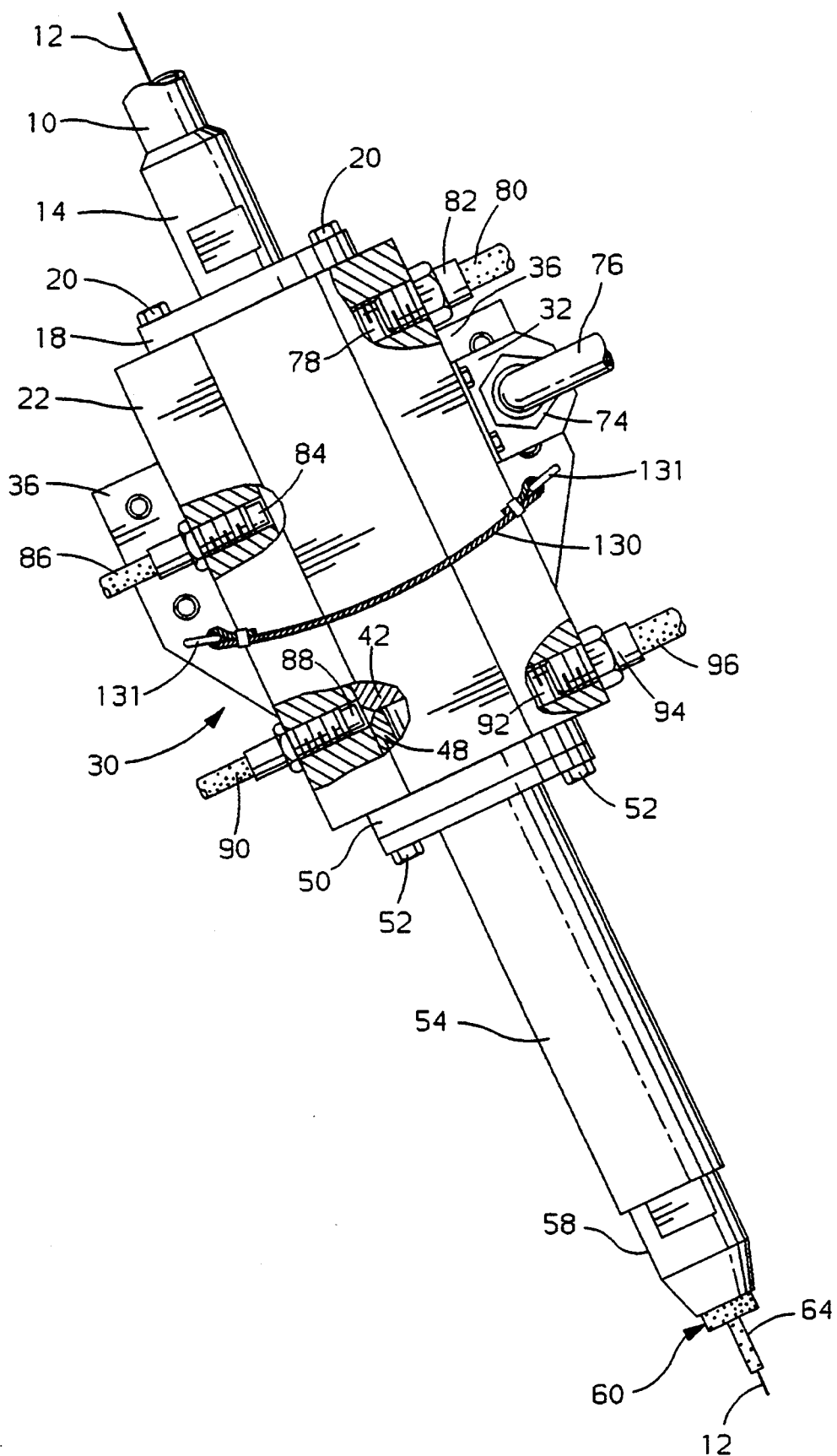
Figure 4:
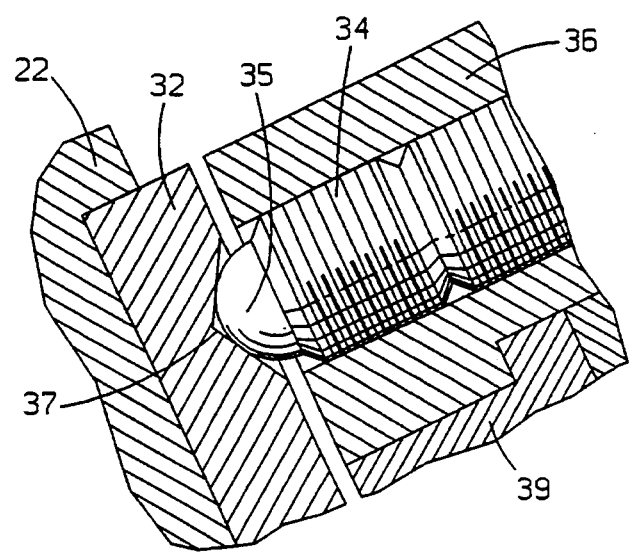

Referring now to FIG. 3, a shield gas such as Helium is provided to the wirefeed apparatus 30 from a Helium supply source (not shown) through hose 80 and nozzle 82 secured to channel 78 in the wirefeed head. The Helium is provided to channel 78 at about 40 pounds/square inch pressure. The Helium flows into piston chamber 26 (FIG. 2) and through the spring 24 into transversal bore 28 in the piston 14. From bore 28, the Helium flows through the central bore 16 in the piston and takes the path of least resistance through the bore 16 of piston 14, to the delivery head 58 and out of the delivery vents 62 in the wire delivery tip 60. The shown structure provides a Helium flow rate of approximately 40 standard cubic feet/hour and the delivery of the Helium in the vicinity of the delivered feed wire provides a gas shield for welding operations.

On the exterior of cylinder 22 is mounting plate 32, having a machined surface facing mount 36, to which magnetic insert 39 (FIG. 4) is mounted for magnetically retaining the plate 32 to mount 36. Pin 34, attached into mount 36, has a hemispheric end 35 fitting into a machined receptacle in plate 32 (See FIG. 4). The receptacle 37 and the hemispheric end 35 locate the plate 32 with respect to plate 36 so that the magnetic inserts 39 retain the two plates together at a proper and repeatable position. For strength the magnetic insert 39 preferably comprise a rare earth magnetic substance, such magnets are readily available and commonly known to those skilled in the art (i.e., an example rare earth magnet is sold by General Motors Corporation under the tradename Magnequench ™ and is described in U.S. Pat. No. 4,496,395).

A proximity sensor 74, powered through cable 76, senses when the plates 32 and 36 become detached, e.g., from an accidental collision of the robot. In the event of an accidental collision, the magnetic retention between plates 32 and 36 is broken so that the wirefeed apparatus 30 breaks away from the mounting plate 36 without damaging either the robot or the wirefeed apparatus 30. A cable 130, mounted to the plate 36, i.e. through a pair of eyelets 131 mounted to plate 36, loosely retains the wirefeed apparatus 30 in position in the event of a collision while not maintaining wirefeed apparatus 30 in any one rigid position, thereby avoiding damage.

Plant air (i.e., a source of pressurized air) is provided through pneumatic hose 96 and nozzle 94, which is mounted to channel 92 in the cylinder 22. Channel 92 provides access for plant air to chamber 46 in the cylinder 22. Air control is provided through conventional pneumatic valve control so that, when plant air is provided to chamber 46 via inlet 92, piston 14 is retracted, also retracting the wirefeed delivery head 58 and ceramic wire delivery tip 60. The presence of the shield gas in piston chamber 26 does not interfere with the piston retraction because of the higher relative pressure of the plant air as compared to the shield gas. Proximity sensors 84 and 88 powered through cables 86 and 90 sense when the piston body 42 is in the retracted position and in the extended position, respectively, so that feedback control of the extension and retraction of the wirefeed head 58 may be implemented.

Figure 5:
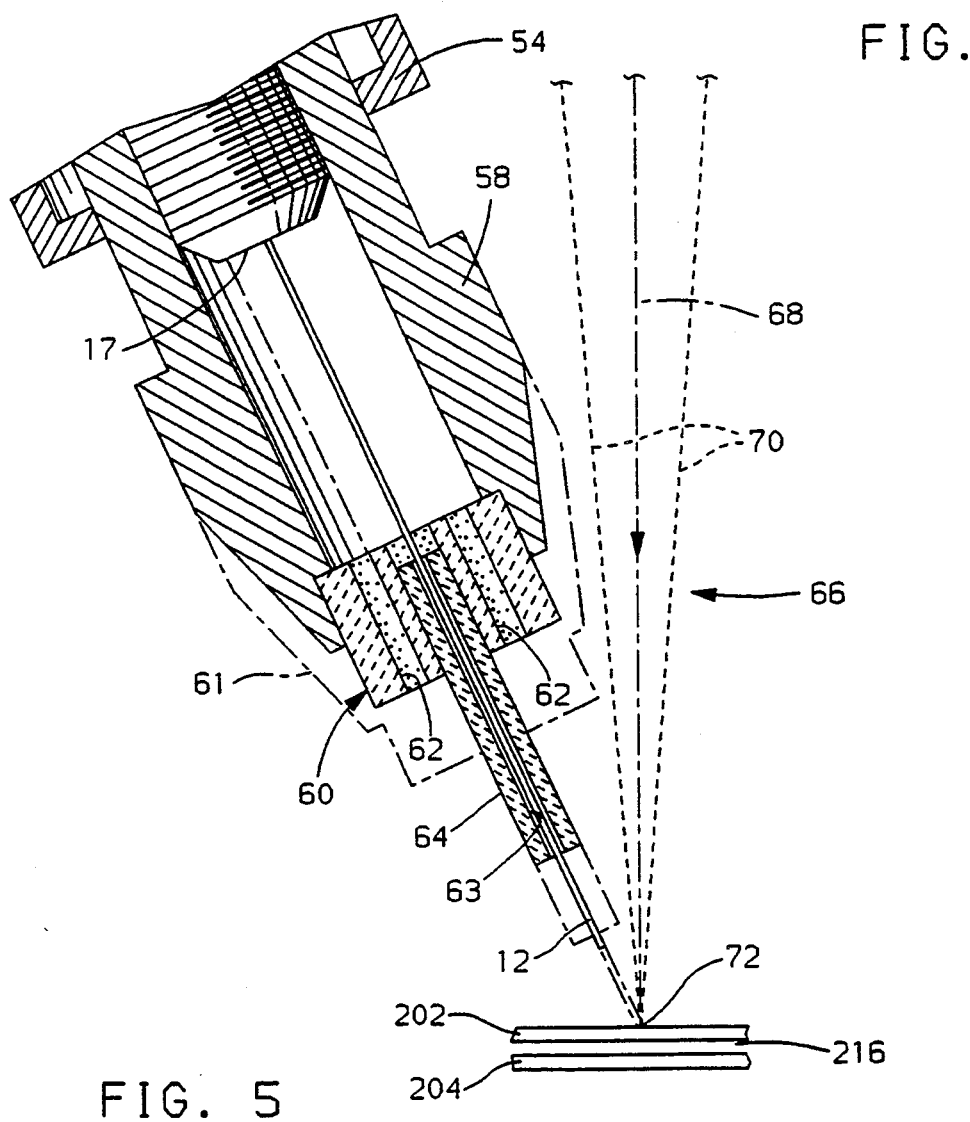

FIG. 5 illustrates the delivery head 58 and a portion of piston 14 in the retracted position relative to the extended position shown by dotted lines 61.

Figure 6:
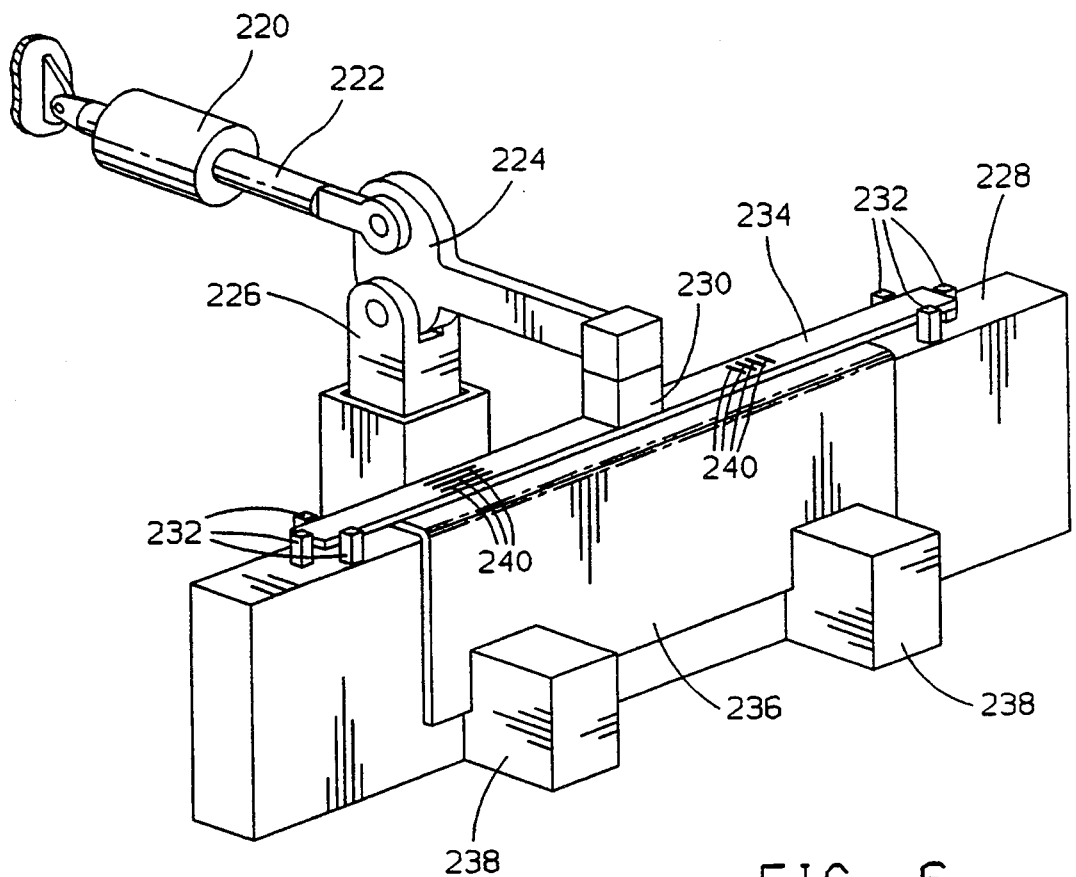
FIG. 6 is an illustration of an example fixture for use with this invention.

FIG. 6 illustrates an example fixture 228 for locating two metal parts 234 and 236 to be welded together according to this invention. The first metal piece 236 is placed in the fixture 228, which supports the first metal piece 236 and locates it with locating blocks 238. Second metal piece 234, which is to be welded to the first metal piece to form an assembly, comprises galvanized steel and is placed on top of the first metal piece 236 and is located by locating blocks 232. Pneumatic cylinder 220 extends its shaft 222, which is pivotably attached to clamp 224, which in turn is pivotably mounted to mount 226, lowering the end 230 of clamp 224 over second metal piece 234 thus retaining piece 234 in place. Weld operations according to this invention are carried out along paths 240 to form weld beads securing the first and second metal pieces 234 and 236 together.

Certain advantages of this invention can be readily appreciated with respect to FIG. 6. The facing surfaces of the metal pieces 234 and 236 proximate to the weld paths 240 need not be perfectly controlled and need not be pressed together to eliminate gaps greater than 0.010 inches as required by the prior art. A resulting benefit is (in the absence of perfectly controlled surfaces) the elimination of the need of pressure clamps surrounding the weld paths 240, several of which were required according to the prior art to press the metal pieces 234 and 236 together to minimize gaps.

Fixture 228 is an example fixture that can be used on a turntable or on a carrier on an assembly line. The example fixture 228 is for illustrative purposes and the type and shape of the fixture used will vary with different implementations of this invention. For example, different shaped metal parts require different fixture devices. Additionally, the fixture device may be constructed to hold several pieces of metal to be welded together instead of just two as shown.

One alternative type of fixture for the two (or more) pieces being welded together is to locate the first piece on a carrier or fixture and to attach the second piece thereto with bent metal tabs as is commonly done for resistance spot weld applications.

Figure 7:
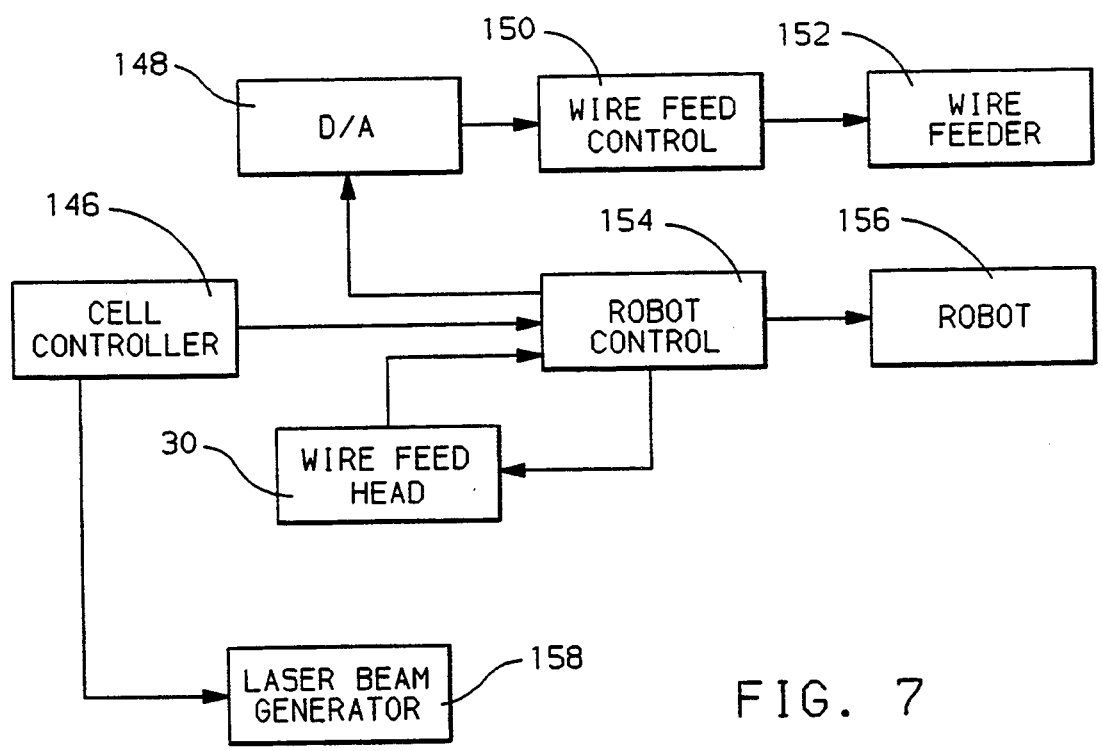
FIG. 7 illustrates a control structure for use with this invention.

FIG. 7 shows a control structure useful with this invention. The robot controller 154 is monitored by a programmable control unit 146 while it delivers commands to the wirefeed unit interface, D/A converter 148, and also controls the robot represented by box 156. Typical wirefeed units, such as unit 126 shown on FIG. 1, utilize analog controllers to control wire speed and a D/A converter 148 must be implemented to interface the robot control unit 154 with the wirefeed unit represented by block 152. Control unit 146 also provides interactive programmable control of the laser beam generator represented by block 158, which generates the laser beam provided to the robot via tubes 100 and 122 and beam bender 102.

Laser beam generators useful as generator 158 are well known to those skilled in the art. For the welding applications associated with this invention a relatively high powered laser is desired. A $CO_2$ laser with a 5 kW power output or any equivalent thereto is ideal. The maximum power output of the laser may vary from implementation to implementation with system constraints such as the thickness of the pieces of metal being welded together, the gap between the pieces, the desired weld speed, the desired weld quality and the desired weld bead width.

Figure 8:
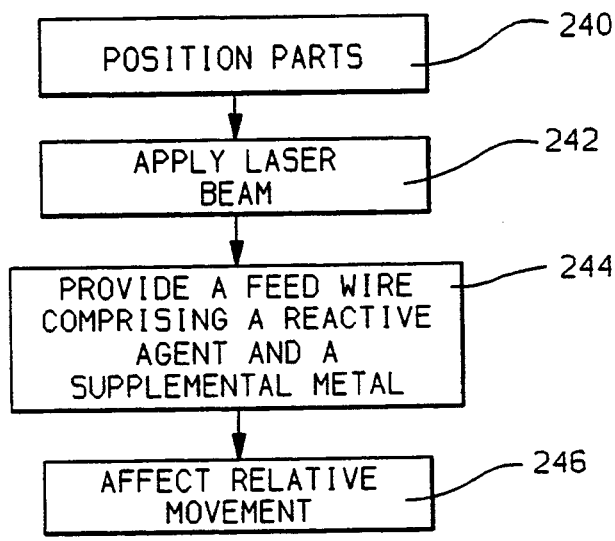
FIG. 8 illustrates the process of this invention.

Referring now to FIG. 8, the welding process of this invention starts at block 240 where two sheet metal parts, at least one being galvanized steel, are positioned in proximity of each other so that each sheet metal part has one surface facing the other sheet metal part across a gap and one surface facing away from the other sheet metal part. The laser beam is applied at block 242 to the facing away surface of one of the sheets of metal and a feed wire comprising a reactive agent and supplemental metal is provided at block 244 to the intersection of the laser beam and the one surface facing away. At block 246, relative movement is affected between the sheet metal pieces and the laser beam to provide a quality laser weld of the two sheet metal parts.

Figure 9:
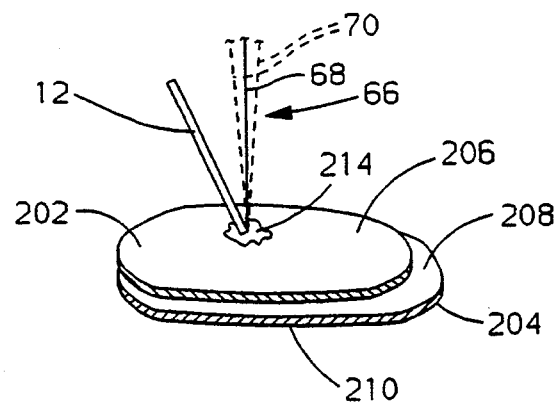
FIGS. 9, 10 and 11 graphically illustrate the process of this invention.
Figure 10:
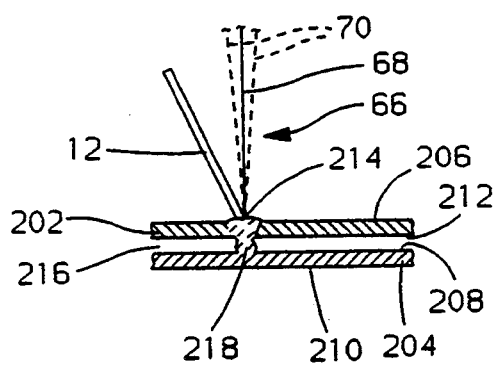
Figure 11:
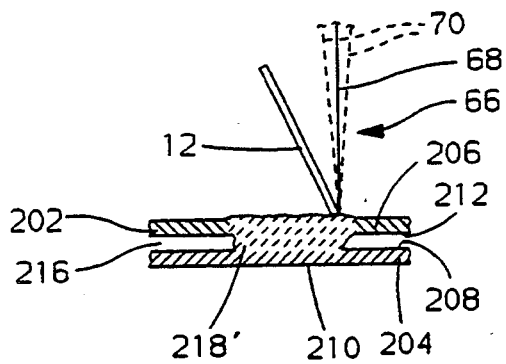

Referring now to FIGS. 9, 10 and 11, the welding process of this invention for laser welding two metal sheets together when at least one sheet comprises galvanized steel and when there is a gap between the two metal sheets is illustrated. The two metal sheets 202 and 204 are placed in proximity of each other as shown so that each sheet 202,204 has a side 212 and 208 facing the other sheet 202,204. Each sheet 202,204 also has a facing away side 206,210 facing away from the other sheet 202,204. Typically, there will be portions of the sides 212 and 208 in contact with each other. However, unless the sides 212 and 208 are perfectly controlled or otherwise forced together, a gap 216 occurs between the two sheets 202, 204. The process of this invention provides a quality weld even if the gap 216 is wider than 0.040 inches.

The weld is initiated by providing a laser beam 66 and a supplemental wire 12 at a point of intersection 214 with one of the facing away sides, here side 206 of sheet 202. When the laser beam is applied, the metal of sheet 202 in the immediate vicinity of point 214 along with part of the wire 12 become molten. The reactive agent in the wire reacts with the zinc in the galvanized steel preventing the zinc from vaporizing, which minimizes the formation of voids and surface porosity in the metal upon solidification.

As shown in FIG. 10, the molten metal and wire begin to flow together and across the gap 216 to sheet 204 causing a melting of a localized area of sheet 204. The molten metals flow together and begin to form bead 218 as shown. Supplemental metal in the feed wire 12 is added to the molten pool to bridge the gap and fill the weld bead to the extent necessary to prevent underfill of the weld.

Relative movement of the laser beam is then affected (i.e., in the manner described above) to cause the laser beam 66 and wire 12 to move along a weld path expanding the weld bead 218 to form bead 218' as shown in FIG. 11. A shield gas is preferably provided with the process in the manner taught above or equivalent. When the complete weld path has been scanned, the wire 12 is withdrawn from the sheet 202 and the laser beam is turned off.

The speed of the welding operation is relatively rapid. For example, for two sheets of plain steel, e.g., SAE 1008-1010, having a gap of 0.050 inches between the sheets, approximately 3 mm wide weld beads can be achieved at a rate of 40 inches per minute and 1 mm wide weld beads can be achieved at a faster rate with a $CO_2$ laser output of 4.5 kW. The supplemental wire used may be AWS E70S-3 (for bare steel) and AWS E70S-6 (for galvanized steel).

Because of the speed of the welding process, only metal on sheets 202 and 204 in the immediate vicinity of the laser beam 66 melt and the bead rapidly cools as the laser is moved from the immediate vicinity.

Advantages provided by the process of this invention are obtained as follows. A superior laser weld of galvanize coated sheet steel results by introducing the feed wire in the form of a solid wire or a type of flux core wire into the molten weld pool to neutralize the volatile reaction normally produced as the zinc on the sheet metal vaporizes during laser welding. This neutralization of the volatile reaction minimizes porosity of the weld. The introduction of the supplemental wire into the molten weld pool fills the gap between the two metal parts and minimizes the level of underfill defect that occurred in prior art welding operations in the presence of a large gap (i.e., gap greater than 0.010 inches). Additionally, by providing a laser weld in the presence of large gaps, tight clamping tolerances previously required for laser welding operations can be relaxed.

Figure 12:
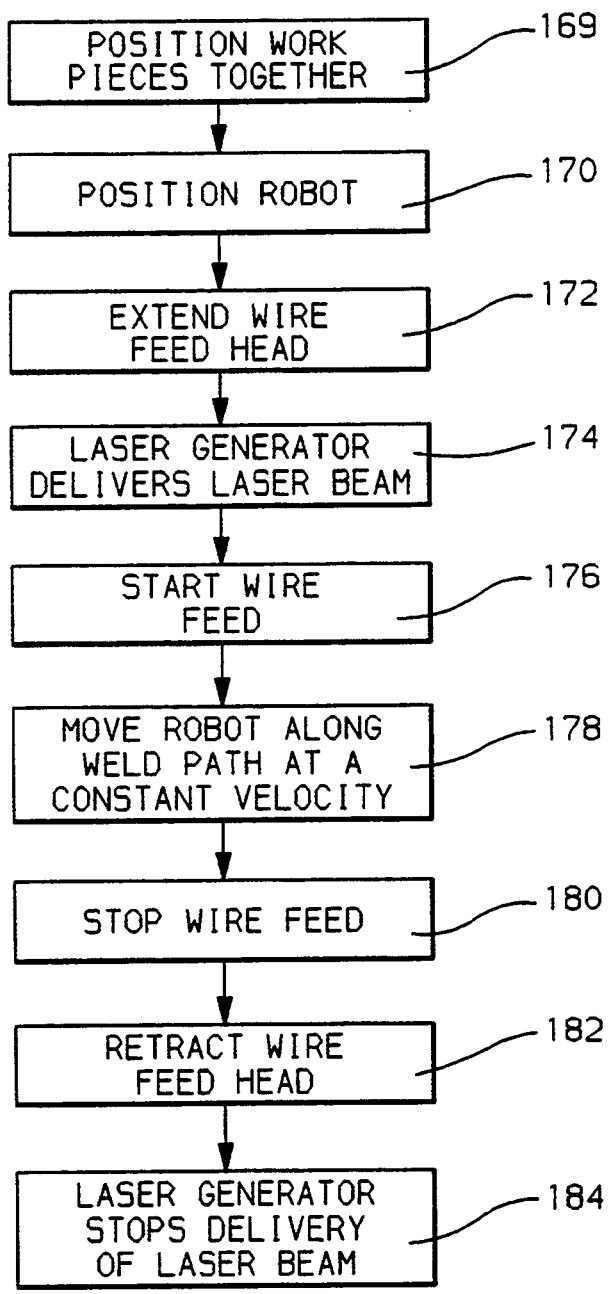
FIG. 12 illustrates a flow diagram of an example implementation of the process of this invention.

Referring to FIG. 12, a detailed example of a process according to this invention starts at block 169. At block 169, the work-pieces are positioned together so that portions of two sheet metal pieces are proximate to each other as shown by pieces 202, 204 in FIGS. 9, 10 and 11. The sheet metal pieces 202,204 each have a side facing the other piece and each have a side facing away from the other piece. Through the process of this invention, a gap 216 may exist between the facing sides of pieces 202,204. The robot is positioned at block 170 over the start position of the weld path. At block 172, the wire-feed head is extended into position so that it is in the position shown in FIG. 2. At block 174 the laser beam generator delivers a laser beam by a command from the robot control unit 154 (FIG. 7). At block 176, the wire 12 is fed through starting of the motorized wire feeder 126 (FIG. 1).

The speed of the wirefeed, as controlled by motorized wire feeder 126, is preprogrammed into robot controller 154 as any one of a selectable number of wirefeed speeds and the selected wirefeed speed corresponds with the thickness of the metal pieces being welded together, the maximum anticipated gap between the work-pieces along the specific weld, and the desired width of the weld. In general, a wider weld bead corresponds to a slower velocity of the robot along the weld path, an optimal laser beam focal offset value, and a faster wire feed rate, obtainable by a faster feed speed of thin wire or use of a thicker wire. Also, corresponding to wider anticipated gaps between the work-pieces 202 and 204, more supplemental wire 12 is necessary, requiring a higher wirefeed speed and/or a thicker wire.

When the laser generator delivers the laser beam at block 174, the laser beam 66 is supplied to the side of steel piece 202 facing away from piece 204. As the laser impinges on work-piece 202 and intersects wire 12, the laser melts a localized area of work-piece 202 and the feed wire 12 and a portion of work-piece 204, so that during the temporary period when the work-pieces and the supplemental wires are molten, they flow together and solidify as a weld bead so that the reactive agent in the feed wire reacts with the zinc in the galvanized steel to prevent volatilization of the zinc.

At block 180, when the robot has finished moving along the weld path, the wirefeed is stopped and the wirefeed head is retracted through injection of air to piston chamber 46 forcing piston 14 to compress spring 24, pulling the wire 12 away from the weld location thereby preventing the wire 12 from being solidified into the weld bead on the work-pieces 202 and 204. At block 184, the laser generator stops delivery of the laser beam, terminating the laser weld.

Referring to FIG. 2, some advantages of this invention can be seen. The robotic arm 40 typically has a maximum load capacity and therefore the wirefeed apparatus 30 is desirably as light as possible. To achieve this lightness, cylinder 22 may be machined from aluminum and the end caps 18 and 50 may be machined from bronze. The delivery head 58 may be machined from copper. In the configuration shown, the wire delivery apparatus 30 provides compactness enabling flexibility in the movement of the laser delivery head 40 and allowing access to more possible weld locations by the robot.

The ceramic wirefeed tip 60 provides heat resistance to the laser weld and is shaped to avoid contact with any fringe radiation by the laser beam. The direction of the laser beam is represented by line 68 and the laser beam being focused at location 72 on the work-pieces is represented by line 70. In general, significant fringe laser beam energy is limited to 150% of the focused laser beam diameter. For example, at a point where the focused laser beam is 10.0 mm in diameter, significant fringe energy may be present within about a 15.0 mm diameter area concentric with the 10.0 mm focused laser beam. As can be seen, the positioning of the wirefeed head avoids contact with the fringe energy represented by dotted lines 70', avoiding possible laser burning of the wirefeed apparatus. Preferably, the parts of the wirefeed head are machined to tight tolerances so that the wire 12 is delivered within about 1 mm of the desired position with respect to the focused laser beam.

Advantageously, the apparatus shown in FIG. 2 provides delivery of the wire with integral delivery of the shield gas through the wirefeed apparatus 30 and the ceramic tip 60. The ceramic tip 60 can be easily removed and replaced in the event it is damaged due to any cause, such as collision.

The above examples of the process and apparatus of this invention describe the laser welding of two sheet metal parts. The process and apparatus of this invention is also useful for welding three or more work-pieces in a stack-up for lap welding. When this invention is used for welding three or more work-pieces, the stack-up of the sheet metal parts may appear similar to the two part stack-ups shown in FIGS. 2, 9, 10 and 11 with the addition of one or more metal parts in the stack-up at the weld location. In performing the lap weld with three or more work pieces in the stack-up, the weld bead must penetrate all of the work-pieces in the stack-up, which may require increasing the power of the laser beam and/or decreasing the weld speed, depending upon the total thickness of the stack-up.

The process and apparatus of this invention described above can be used for improved laser weld quality for lap welds, butt welds or component welds. Variations in the laser welding process of this invention may result in the use of a different laser generator, feed wire, wire feed apparatus, shield gas, or metal joint configurations than those shown in the illustrations above to affect a desired laser weld result while falling within the scope of this invention. Moreover, various other improvements and modifications to this invention may occur to those skilled in the art and those improvements and modifications will fall within the scope of this invention as set forth below.

The embodiments of the invention in which an exclusive property or privilege is claimed are defined as follows:

1. An apparatus for welding galvanized steel, comprising:
    means for positioning a first sheet metal part in proximity of a second sheet metal part so that the first sheet metal part has a surface facing away from the second sheet metal part, at least one of the first and second sheet metal parts comprising galvanized steel;
    a laser beam delivery device adapted for applying a laser beam to the facing away surface of the first sheet metal part;
    a supply of feed wire wherein the feed wire comprises a supplemental metal and a reactive agent;
    a feed wire device adapted for providing the feed wire at an intersection of the laser beam and the facing away surface of the first metal part; and
    means for affecting relative movement between the laser beam and the first and second sheet metal parts, wherein the reactive agent reacts with zinc in the sheet metal part comprising galvanized steel to prevent at least a portion of the zinc from vaporizing and wherein the supplemental metal acts as filler for a resulting weld to provide quality laser welding of the two sheet metal parts, wherein a gap at least 0.040 inches wide exists between the first and second sheet metal parts.

2. The apparatus of claim 1 wherein the laser beam delivery device is a robot.

3. The apparatus of claim 1 wherein the means for affecting relative movement comprises a robot.

4. The apparatus of claim 1, also comprising means for providing a shield gas.

5. The apparatus of claim 1, also comprising means for providing a shield gas with the feed wire.

6. The apparatus set forth in claim 2 also comprising a control unit for controlling the robot and a motorized wire feeder responsive to the control unit.

7. The apparatus set forth in claim 6 also comprising a laser beam generator responsive to the control unit.

8. A weld process comprising the steps of:
    positioning a first sheet metal part in proximity of a second sheet metal part so that the first sheet metal part has a surface facing away from the second sheet metal part, at least one of the first and second sheet metal parts comprising galvanized steel;
    applying a laser beam to the facing away surface of the first sheet metal part;
    supplying a feed wire comprising a supplemental metal and a reactive agent at an intersection of the laser beam and the facing away surface of the first metal part; and
    affecting a relative movement between the laser beam and the first and second sheet metal parts, wherein the reactive agent reacts with zinc in the sheet metal part comprising galvanized steel to prevent at least a portion of the zinc from vaporizing and wherein the supplemental metal acts as filler for a resulting weld to provide quality laser welding of the two sheet metal parts, wherein a gap of at least 0.040 inches exists between at least a portion of the first and second metal parts.

9. A process comprising the steps of:
    positioning a first work piece and second work piece together so that the first and second work pieces have first and second facing surfaces and so that a gap exists between at least a portion of the first and second facing surfaces, at least one of the first and second work pieces comprising galvanized steel and including zinc;
    applying a laser beam to an outside surface of the first work piece facing away from the second work piece;
    providing a feed wire comprising a reactive agent and a supplemental metal at an intersection of the laser beam and the outside surface of the first work piece;

affecting a first melting of a first localized portion of the first work piece and a portion of the supplemental metal;

affecting a reaction between the reactive agent and the zinc preventing at least a portion of the zinc from volatilizing;

affecting a flow of the first melted first localized portion and the melted supplemental metal into the gap to bridge the first and second work pieces;

affecting a second melting of a second localized portion of the second work piece proximate to the first melted first localized portion to form a molten weld bead;

moving the laser beam along a weld path; and feeding the wire proximate to the intersection of the laser beam and the first work piece to weld the first and second work pieces together, wherein the gap is approximately 0.040 inches wide over at least a portion of the weld path.

10. An apparatus for welding galvanized steel, comprising:

means for positioning at least three sheet metal parts in a stack-up, wherein at least one of the sheet metal parts includes one a surface facing away from other sheet metal parts and wherein at least one of the sheet metal parts comprises galvanized steel;

a laser beam delivery device adapted for applying a laser beam to the one facing away surface;

a supply of feed wire wherein the feed wire comprises a supplemental metal and a reactive agent;

a feed wire device adapted for providing the feed wire at an intersection of the laser beam and the one facing away surface; and means for affecting relative movement between the laser beam and the stack-up, wherein the reactive agent reacts with zinc in the sheet metal part comprising galvanized steel to prevent at least a portion of the zinc from vaporizing and wherein the supplemental metal acts as filler for a resulting weld to provide quality laser welding of the at least three sheet metal parts.

11. The apparatus set forth in claim 10 wherein four sheet metal parts are positioned in the stack-up and welded by the laser beam.

12. A weld process comprising the steps of:

positioning at least three sheet metal parts in a stack-up, wherein at least one of the sheet metal parts includes one surface facing away from other sheet metal parts, and wherein at least one of the sheet metal parts comprises galvanized steel;

applying a laser beam to the one facing away surface;

supplying a feed wire comprising a supplemental metal and a reactive agent at an intersection of the laser beam and the one facing away surface; and affecting a relative movement between the laser beam and the stack-up, wherein the reactive agent reacts with zinc in the sheet metal part comprising galvanized steel to prevent at least a portion of the zinc from vaporizing and wherein the supplemental metal acts as filler for a resulting weld to provide quality laser welding of the at least three sheet metal parts.

13. The process of claim 12 wherein four sheet metal parts are positioned in the stack-up and welded by the laser beam.

* * * * *